United States Patent
Nehmadi et al.

(12)

(10) Patent No.: US 12,428,020 B2
(45) Date of Patent: Sep. 30, 2025

(54) FUNCTIONAL SAFETY IN AUTONOMOUS DRIVING

(71) Applicant: VayaVision Sensing Ltd., Or Yehuda (IL)

(72) Inventors: Youval Nehmadi, Nili (IL); Shmuel Mangan, Nes Ziona (IL); Mark Wagner, Rehovot (IL)

(73) Assignee: VayaVision Sensing Ltd., Or Yehuda (IL)

( * ) Notice: Subject to any disclaimer, the term of this patent is extended or adjusted under 35 U.S.C. 154(b) by 429 days.

(21) Appl. No.: 17/762,342

(22) PCT Filed: Sep. 22, 2020

(86) PCT No.: PCT/IL2020/051027
§ 371 (c)(1),
(2) Date: Mar. 21, 2022

(87) PCT Pub. No.: WO2021/053679
PCT Pub. Date: Mar. 25, 2021

(65) Prior Publication Data
US 2022/0363289 A1  Nov. 17, 2022

Related U.S. Application Data

(60) Provisional application No. 62/903,845, filed on Sep. 22, 2019.

(51) Int. Cl.
*B60W 60/00* (2020.01)
*B60W 30/14* (2006.01)
(Continued)

(52) U.S. Cl.
CPC ........ *B60W 60/001* (2020.02); *B60W 30/143* (2013.01); *B60W 40/06* (2013.01);
(Continued)

(58) Field of Classification Search
CPC .. B60W 60/001; B60W 30/143; B60W 40/06; B60W 50/0205; B60W 50/14; G06N 3/02
See application file for complete search history.

(56) References Cited

U.S. PATENT DOCUMENTS

| 9,274,525 B1 | 3/2016 | Ferguson et al. |
| RE46,930 E | 7/2018 | Mimeault |

(Continued)

FOREIGN PATENT DOCUMENTS

| CA | 3155591 | 4/2023 |
| CN | 110084116 A | 8/2019 |

(Continued)

OTHER PUBLICATIONS

International Preliminary Report on Patentability in International Appln. No. PCT/IL2020/051027, mailed on Mar. 31, 2022, 14 pages.

(Continued)

*Primary Examiner* — Peter D Nolan
*Assistant Examiner* — Mikko Okechukwu Obioha
(74) *Attorney, Agent, or Firm* — Fish & Richardson P.C.

(57) ABSTRACT

Autonomous driving of a vehicle in which computerized perception by the vehicle, including of its environment and of itself (e.g., its egomotion), is used to autonomously drive the vehicle and, additionally, can also be used to provide feedback to enhance performance, safety, and/or other attributes of autonomous driving of the vehicle (e.g., when certain conditions affecting the vehicle are determined to exist by detecting patterns in or otherwise analyzing what is perceived by the vehicle), such as by adjusting autonomous driving of the vehicle, conveying messages regarding the vehicle, and/or performing other actions concerning the vehicle.

34 Claims, 8 Drawing Sheets

(51) Int. Cl.
*B60W 40/06* (2012.01)
*B60W 50/02* (2012.01)
*B60W 50/14* (2020.01)
*G06N 3/02* (2006.01)

(52) U.S. Cl.
CPC ........ *B60W 50/0205* (2013.01); *B60W 50/14* (2013.01); *G06N 3/02* (2013.01); *B60W 2420/403* (2013.01); *B60W 2420/408* (2024.01); *B60W 2552/05* (2020.02); *B60W 2552/30* (2020.02); *B60W 2552/35* (2020.02); *B60W 2552/40* (2020.02); *B60W 2554/406* (2020.02); *B60W 2555/20* (2020.02); *B60W 2556/35* (2020.02); *B60W 2556/40* (2020.02)

(56) References Cited

U.S. PATENT DOCUMENTS

| | | | |
|---|---|---|---|
| RE47,134 E | | 11/2018 | Mimeault |
| 10,444,357 B2 | | 10/2019 | Nehmadi et al. |
| RE48,763 E | | 10/2021 | Mimeault |
| 11,226,413 B2 | | 1/2022 | Nehmadi et al. |
| RE48,914 E | | 2/2022 | Mimeault et al. |
| 11,292,483 B2 | | 4/2022 | Nehmadi et al. |
| 11,402,510 B2 | | 8/2022 | Baribault |
| 2013/0268150 | A1* | 10/2013 | Weslati ................ B60W 10/08 701/1 |
| 2014/0195112 | A1 | 7/2014 | Jianbo et al. |
| 2016/0291154 | A1 | 10/2016 | Nehmadi et al. |
| 2016/0291155 | A1 | 10/2016 | Nehmadi et al. |
| 2017/0123428 | A1 | 5/2017 | Levinson et al. |
| 2018/0142394 | A1 | 5/2018 | DeBates et al. |
| 2018/0239361 | A1* | 8/2018 | Micks ................ G06V 10/764 |
| 2018/0308364 | A1* | 10/2018 | Kume ................ G06V 20/58 |
| 2019/0381999 | A1* | 12/2019 | Yu .................... B60W 60/0015 |
| 2020/0062273 | A1 | 2/2020 | Nehmadi et al. |
| 2021/0080575 | A1 | 3/2021 | Nehmadi et al. |
| 2021/0129868 | A1 | 5/2021 | Nehmadi |
| 2021/0293963 | A1 | 9/2021 | Nehmadi et al. |
| 2021/0354723 | A1* | 11/2021 | McCool ............ G06V 20/588 |
| 2022/0026539 | A1 | 1/2022 | Bernier et al. |
| 2022/0026540 | A1* | 1/2022 | Olivier .................... G01S 7/499 |
| 2022/0026573 | A1* | 1/2022 | Baribault ........... G02B 27/0081 |
| 2022/0026576 | A1* | 1/2022 | Baribault ................ G01S 17/86 |
| 2022/0137214 | A1 | 5/2022 | Nehmadi et al. |
| 2022/0229190 | A1 | 7/2022 | Nehmadi et al. |

FOREIGN PATENT DOCUMENTS

| | | |
|---|---|---|
| CN | 114765973 | 7/2022 |
| HK | 40079163 | 4/2023 |
| JP | 2005300227 A | 10/2005 |
| JP | 2010137757 A | 6/2010 |
| JP | 2017159789 A | 9/2017 |
| JP | 2018008688 A | 1/2018 |
| JP | 2018203250 A | 12/2018 |
| JP | 2022551412 | 12/2022 |
| KR | 1020220099949 | 7/2022 |
| WO | WO 2018142394 | 8/2018 |
| WO | WO 2021053679 A2 | 3/2021 |

OTHER PUBLICATIONS

International Search Report and Written Opinion in International Appln. No. PCT/IL2020/051027, mailed on Apr. 22, 2021, 15 pages.

Communication pursuant to Rule 71(3) EPC "Intention to grant" dated May 21, 2024 and the text intended for grant issued in connection with European Patent Application No. 20865071.3, 50 pages.

Examiner's Report issued on May 5, 2022 in connection with CA patent application No. 3,155,591, 8 pages.

Extended European Search Report issued in connection with European application No. 20865071.3 on Jul. 31, 2023, 11 pages.

Kurihata H. et al: "Rainy weather recognition from in-vehicle camera images for driver assistance", Intelligent Vehicles Symposium, 2005. Proceedings. IEEE Las Vegas, NV, USA Jun. 6-8, 2005, Piscataway, NJ, USA, IEEE, Piscataway, NJ, USA, Jun. 6, 2005 (Jun. 6, 2005), pp. 205-210, XP010833968, DOI: 10.1109/IVS. 2005.1505103 ISBN: 978-0-7803-8961-8.

Office Action issued in connection with JP Patent Application No. 2022-518801 on Aug. 1, 2024, 3 pages, and English translation.

* cited by examiner

FUNCTIONAL SAFETY IN AUTONOMOUS DRIVING

CROSS-REFERENCE TO RELATED APPLICATION

The present application is the national stage entry of International Patent Application No. PCT/IL2020/051027, filed on Sep. 22, 2020, and claims priority to U.S. Provisional Patent Application 62/903,845, filed on Sep. 22, 2019, the disclosures of which are incorporated—by reference herein.

FIELD

This disclosure relates to vehicles (e.g., automobiles, trucks, buses, and other road vehicles) with an autonomous driving (a.k.a., self-driving) capability.

BACKGROUND

Vehicles capable of autonomous driving (i.e., self-driving), which are drivable without human control (e.g., by steering, accelerating, and/or decelerating themselves autonomously) during at least part of their use, are becoming more prevalent.

For example, automobiles, trucks, and other road vehicles may be characterized by various level of driving automation (e.g., any one of levels 2 to 5 of SAE J3016 levels of driving automation), from partial driving automation using one or more advanced driver-assistance systems (ADAS) to full driving automation.

Computerized perception by these vehicles of their environment and of themselves (e.g., their egomotion), based on various sensors (e.g., cameras, lidar (light detection and ranging) devices, radar devices, GPS or other location sensors, inertial measurement units (IMUs), etc.), is used to autonomously drive them, by determining where and how to safely move them and controlling actuators (e.g., of their powertrain, steering system, etc.) to move them accordingly.

While it has greatly advanced, the computerized perception by these vehicles may remain underutilized in some cases, and this may lead to suboptimal performance, safety, and/or other attributes of autonomous driving of these vehicles.

For these and other reasons, there is a need for improvements directed to vehicles with an autonomous driving capability.

SUMMARY

According to various aspects, this disclosure relates to autonomous driving or various levels of driving assistance of a vehicle in which computerized perception by the vehicle, including of its environment and of itself (e.g., its egomotion), is used to autonomously drive the vehicle and, additionally, can also be used to provide feedback to enhance performance, safety, and/or other attributes of autonomous driving of the vehicle (e.g., when certain conditions affecting the vehicle are determined to exist by detecting patterns in or otherwise analyzing what is perceived by the vehicle), such as by adjusting autonomous driving of the vehicle, conveying messages regarding the vehicle, and/or performing other actions concerning the vehicle.

For example, according to one aspect, this disclosure relates to a system for autonomous driving or various levels of driving assistance of a vehicle. The system comprises an interface configured to receive data from sensors of the vehicle that include a camera and a lidar sensor, among others. The system also comprises a processing entity comprising at least one processor and configured to: provide perception information regarding perception of an environment of the vehicle and a state of the vehicle based on the data from the sensors, the perception information comprising a 3D model of the environment of the vehicle and information about a position of the vehicle; generate control signals for autonomously driving the vehicle based on the 3D model of the environment of the vehicle and the information about the position of the vehicle; and process the perception information, other than for generating the control signals for autonomously driving the vehicle based on the 3D model of the environment of the vehicle and the information about the position of the vehicle, to determine whether a predefined condition affecting the vehicle exists and, if so, perform an action concerning the vehicle based on the predefined condition.

According to another aspect, this disclosure relates to a system for autonomous driving or various levels of driving assistance of a vehicle. The system comprises an interface configured to receive data from sensors of the vehicle that include a camera and a lidar sensor, among others. The system also comprises a processing entity comprising at least one processor and configured to: provide perception information regarding perception of an environment of the vehicle and a state of the vehicle based on the data from the sensors, the perception information comprising a 3D model of the environment of the vehicle and information about a position of the vehicle; generate control signals for autonomously driving the vehicle based on the 3D model of the environment of the vehicle and the information about the position of the vehicle; and process the perception information to detect a pattern in the perception information indicative of a predefined condition affecting the vehicle.

According to another aspect, this disclosure relates to non-transitory computer-readable media comprising instructions executable by a processing apparatus for autonomous driving or various levels of driving assistance of a vehicle, wherein the instructions, when executed by the processing apparatus, cause the processing apparatus to: receive data from sensors of the vehicle that include a camera and a lidar sensor, among others; provide perception information regarding perception of an environment of the vehicle and a state of the vehicle based on the data from the sensors, the perception information comprising a 3D model of the environment of the vehicle and information about a position of the vehicle; generate control signals for autonomously driving the vehicle based on the 3D model of the environment of the vehicle and the information about the position of the vehicle; and process the perception information, other than for generating the control signals for autonomously driving the vehicle based on the 3D model of the environment of the vehicle and the information about the position of the vehicle, to determine whether a predefined condition affecting the vehicle exists and, if so, perform an action concerning the vehicle based on the predefined condition.

According to another aspect, this disclosure relates to non-transitory computer-readable media comprising instructions executable by a processing apparatus for autonomous driving or various levels of driving assistance of a vehicle, wherein the instructions, when executed by the processing apparatus, cause the processing apparatus to: receive data from sensors of the vehicle that include a camera and a lidar sensor, among others; provide perception information regarding perception of an environment of the vehicle and a state of the vehicle based on the data from the sensors, the perception information comprising a 3D model of the environment of the vehicle and information about a position of the vehicle; generate control signals for autonomously driving the vehicle based on the 3D model of the environment of the vehicle and the information about the position of the vehicle; and process the perception information to detect a pattern in the perception information indicative of a predefined condition affecting the vehicle.

According to another aspect, this disclosure relates to a method for autonomous driving or various levels of driving assistance of a vehicle. The method comprises: receiving data from sensors of the vehicle that include a camera and a lidar sensor, among others; providing perception information regarding perception of an environment of the vehicle and a state of the vehicle based on the data from the sensors, the perception information comprising a 3D model of the environment of the vehicle and information about a position of the vehicle; generating control signals for autonomously driving the vehicle based on the 3D model of the environment of the vehicle and the information about the position of the vehicle; and processing the perception information, other than for generating the control signals for autonomously driving the vehicle based on the 3D model of the environment of the vehicle and the information about the position of the vehicle, to determine whether a predefined condition affecting the vehicle exists and, if so, perform an action concerning the vehicle based on the predefined condition.

According to another aspect, this disclosure relates to a method for autonomous driving or various levels of driving assistance of a vehicle. The method comprises: receiving data from sensors of the vehicle that include a camera and a lidar sensor, among others; providing perception information regarding perception of an environment of the vehicle and a state of the vehicle based on the data from the sensors, the perception information comprising a 3D model of the environment of the vehicle and information about a position of the vehicle; generating control signals for autonomously driving the vehicle based on the 3D model of the environment of the vehicle and the information about the position of the vehicle; and processing the perception information to detect a pattern in the perception information indicative of a predefined condition affecting the vehicle.

These and other aspects of this disclosure will now become apparent to those of ordinary skill upon review of a description of embodiments in conjunction with accompanying drawings.

BRIEF DESCRIPTION OF DRAWINGS

A detailed description of embodiments is provided below, by way of example only, with reference to accompanying drawings, in which.

Figure 1:
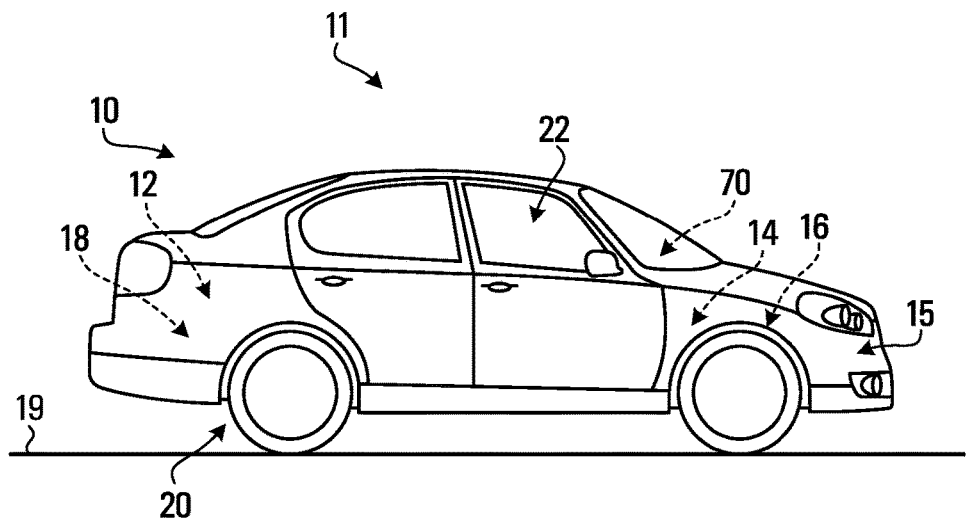
FIG. 1 shows an embodiment of a vehicle capable of autonomous driving.
Figure 2:
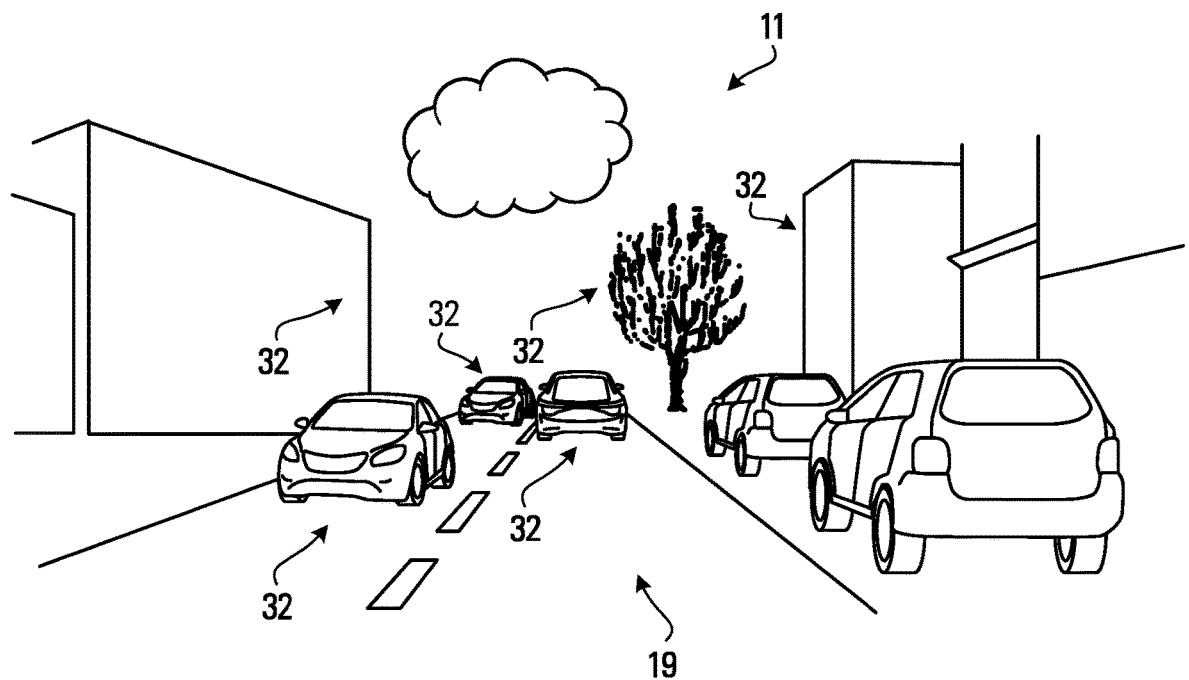
FIG. 2 shows an example of a scene of an environment of the vehicle.
Figure 3:
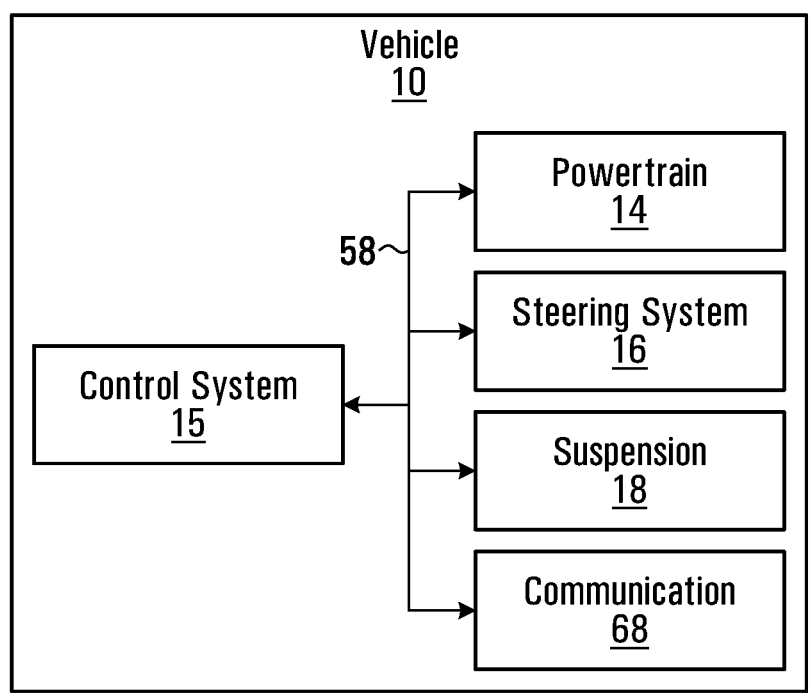
FIG. 3 shows examples of components of the vehicle.
Figure 4:
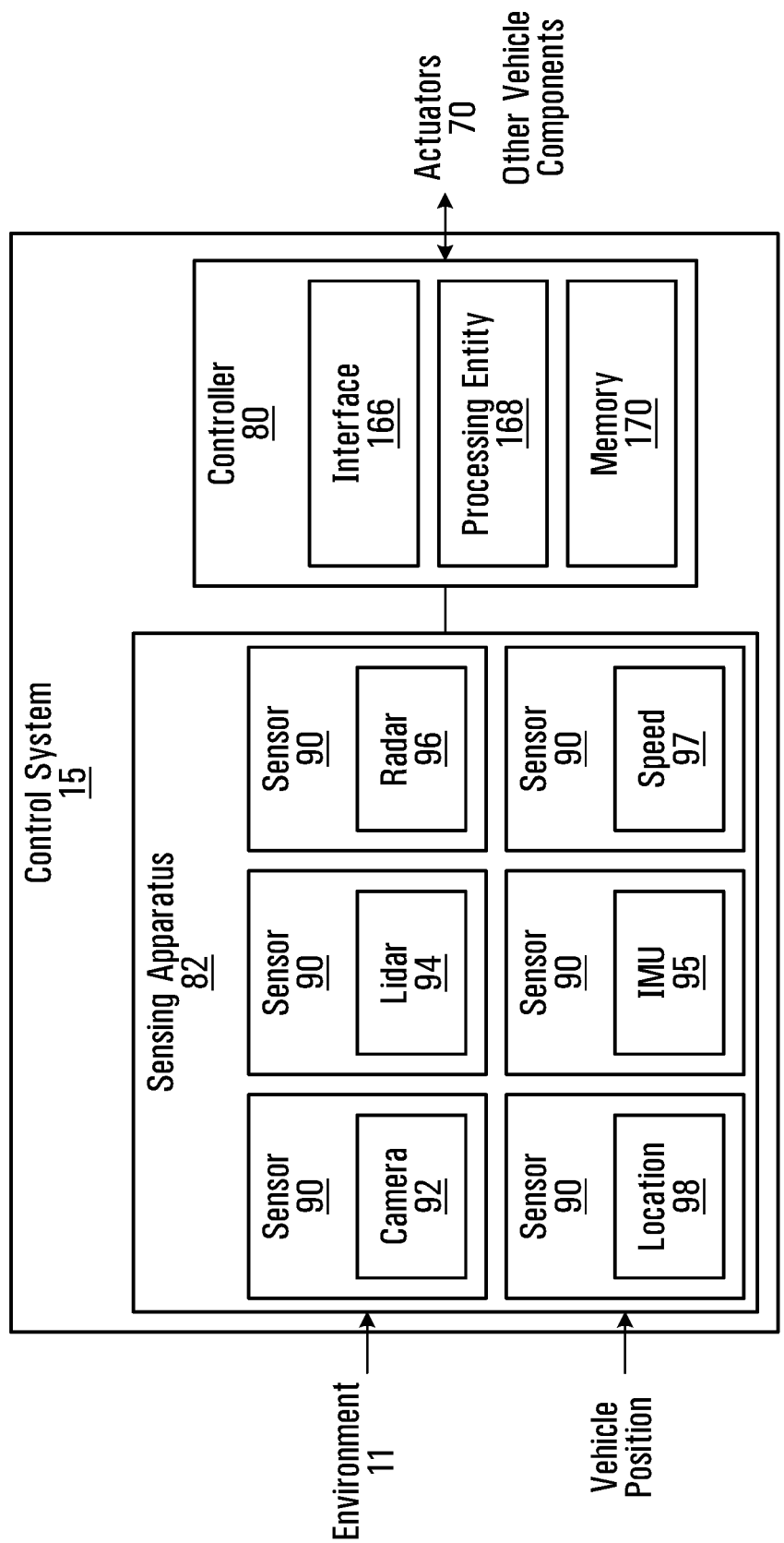
FIG. 4 shows an embodiment of a control system of the vehicle.

It is to be expressly understood that the description and drawings are only for purposes of illustrating some embodiments and are an aid for understanding. They are not intended to and should not be limiting.

DETAILED DESCRIPTION OF EMBODIMENTS

FIGS. 1 to 5 show an embodiment of a vehicle 10 capable of autonomous driving (i.e., self-driving) in an environment 11 of the vehicle 10. In this embodiment, the vehicle 10 is a road vehicle and its environment 11 includes a road 19. The vehicle 10 is designed to legally carry people and/or cargo on the road 19, which is part of a public road infrastructure (e.g., public streets, highways, etc.). In this example, the vehicle 10 is an automobile (e.g., a passenger car).

The vehicle 10 is capable of autonomous driving in that, for at least part of its use, it is drivable without direct human control, including by steering, accelerating, and/or decelerating (e.g., braking) itself autonomously, to travel towards a destination. Although it can drive itself, in some embodiments, the vehicle 10 may be controlled or supervised by a human driver in some situations. The vehicle 10 can thus be characterized by any level of driving automation or assistance (e.g., any one of levels 2 to 5 of SAE J3016 levels of driving automation), from partial driving automation using one or more advanced driver-assistance systems (ADAS) to full driving automation.

As further discussed below, in this embodiment, computerized perception by the vehicle 10, including of its environment 11 and of itself (e.g., its egomotion), is used to autonomously drive the vehicle 10 and, additionally, can also be used to provide feedback to enhance performance, safety, and/or other attributes of autonomous driving of the vehicle 10 (e.g., when certain conditions affecting the vehicle 10 are determined to exist by detecting patterns in or otherwise analyzing what is perceived by the vehicle 10), such as by adjusting autonomous driving of the vehicle 10, conveying messages regarding the vehicle 10, and/or performing other actions concerning the vehicle 10.

In this embodiment, the vehicle 10 comprises a frame 12, a powertrain 14, a steering system 16, a suspension 18, wheels 20, a cabin 22, and a control system 15 that is configured to operate the vehicle 10 autonomously (i.e., without human control) at least for part of its use.

The powertrain 14 is configured to generate power for the vehicle 10, including motive power for the wheels 20 to propel the vehicle 10 on the road 19. To that end, the powertrain 14 comprises a power source (e.g., a prime mover) that includes one or more motors. For example, in some embodiments, the power source of the powertrain 14 may comprise an internal combustion engine, an electric motor (e.g., powered by a battery), or a combination of different types of motor (e.g., an internal combustion engine and an electric motor). The powertrain 14 can transmit power from the power source to one or more of the wheels 20 in any suitable way (e.g., via a transmission, a differential, a shaft engaging (i.e., directly connecting) a motor and a given one of the wheels 20, etc.).

The steering system 16 is configured to steer the vehicle 10 on the road 19. In this embodiment, the steering system 16 is configured to turn front ones of the wheels 20 to change their orientation relative to the frame 12 of the vehicle 10 in order to cause the vehicle 10 to move in a desired direction.

The suspension 18 is connected between the frame 12 and the wheels 20 to allow relative motion between the frame 12 and the wheels 20 as the vehicle 10 travels on the road 19.

For example, the suspension 18 may enhance handling of the vehicle 10 on the road 19 by absorbing shocks and helping to maintain traction between the wheels 20 and the road 19. The suspension 18 may comprise one or more springs, dampers, and/or other resilient devices.

The cabin 22 is configured to be occupied by one or more occupants of the vehicle 10. In this embodiment, the cabin 22 comprises a user interface 70 configured to interact with one or more occupants of the vehicle and comprising an input portion that includes one or more input devices (e.g., a set of buttons, levers, dials, etc., a touchscreen, a microphone, etc.) allowing an occupant of the vehicle 10 to input commands and/or other information into the vehicle 10 and an output portion that includes one or more output devices (e.g., a display, a speaker, etc.) to provide information to an occupant of the vehicle 10. The output portion of the user interface 70 may comprise an instrument panel (e.g., a dashboard) which provides indicators (e.g., a speedometer indicator, a tachometer indicator, etc.) related to operation of the vehicle 10.

The control system 15 is configured to operate the vehicle 10, including to steer, accelerate, and/or decelerate (e.g., brake) the autonomous vehicle 10, autonomously (i.e., without human control) as the vehicle 10 progresses towards a destination along a route on the road 19. More particularly, the control system 15 comprises a controller 80 and a sensing apparatus 82 to perform actions controlling the vehicle 10 (e.g., actions to steer, accelerate, decelerate, etc.) to move it towards its destination on the road 19, notably based on a computerized perception of the environment 11 of the vehicle 10 and of the vehicle 10 itself (e.g., its egomotion).

While its control system 15 enables it to drive itself, the vehicle 10 may be controlled by a human driver, such as an occupant in the cabin 22, in some situations. For example, in some embodiments, the control system 15 may allow the vehicle 10 to be selectively operable either autonomously (i.e., without human control) or under human control (i.e., by a human driver) in various situations (e.g., the vehicle 10 may be operable in either of an autonomous operational mode and a human-controlled operational mode). For instance, in this embodiment, the user interface 70 of the cabin 22 may comprise an accelerator (e.g., an acceleration pedal), a braking device (e.g., a brake pedal), and a steering device (e.g., a steering wheel) that can be operated by a human driver in the cabin 22 to control the vehicle 10 on the road 19.

The controller 80 is a processing apparatus configured to process information received from the sensing apparatus 82 and possibly other sources in order to perform actions controlling the vehicle 10, including to steer, accelerate, and/or decelerate the vehicle 10, towards its destination on the road 19. In this embodiment, the controller 80 comprises an interface 166, a processing entity 168, and memory 170, which are implemented by suitable hardware and software.

The interface 166 comprises one or more inputs and outputs (e.g., an input/output interface) allowing the controller 80 to receive input signals from and send output signals to other components to which the controller 80 is connected (i.e., directly or indirectly connected), including the sensing apparatus 82, the powertrain 14, the steering system 16, the suspension 18, and possibly other components such as the user interface 70, a communication interface 68 configured to communicate over a communication network (e.g., a cellular or other wireless network, for internet and/or other communications) and/or with one or more other vehicles that are near the vehicle 10 (i.e., for inter-vehicle communications), etc. The controller 80 may communicate with other components of the vehicle 10 via a vehicle bus 58 (e.g., a Controller Area Network (CAN) bus or other suitable vehicle bus).

The processing entity 168 comprises one or more processors for performing processing operations that implement functionality of the controller 80. A processor of the processing entity 168 may be a general-purpose processor executing program code stored in the memory 170. Alternatively, a processor of the processing entity 168 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory 170 comprises one or more memory elements for storing program code executed by the processing entity 168 and/or data (e.g., maps, vehicle parameters, etc.) used during operation of the processing entity 168. A memory element of the memory 170 may be a semiconductor medium (including, e.g., a solid-state memory), a magnetic storage medium, an optical storage medium, and/or any other suitable type of memory. A memory element of the memory 170 may include a read-only memory (ROM) element and/or a random-access memory (RAM) element, for example.

In some embodiments, the controller 80 may be associated with (e.g., comprise and/or interact with) one or more other control units of the vehicle 10. For example, in some embodiments, the controller 80 may comprise and/or interact with a powertrain control unit of the powertrain 14, such as an engine control unit (ECU), a transmission control unit (TCU), etc.

The sensing apparatus 82 comprises sensors 90 configured to sense aspects of the environment 11 of the vehicle 10, including objects 32 (e.g., people; animals; other vehicles; inanimate things; traffic-management devices such as traffic lights and traffic signs; other obstacles; lanes; free drivable areas; and/or any other tangible static or dynamic objects) in that environment, sense aspects of a state of the vehicle 10 including a position (e.g., a location, an orientation, and/or motion) of the vehicle 10, and generate data indicative of these aspects that is provided to the controller 80 which can process it to determine actions to be autonomously performed by the vehicle 10 in order for the vehicle 10 to continue moving towards its destination.

The sensors 90 may include any suitable sensing device. For example, in some embodiments, the sensors 90 may comprise:
- one or more passive sensors such as a camera 92, a sound sensor, a light sensor, etc.;
- one or more active sensors such as a lidar (light detection and ranging) sensor 94 (e.g., a solid-state lidar device without spinning mechanical components such as a microelectromechanical system (MEMS) lidar, a flash lidar, an optical phase array lidar, or frequency-modulated continuous wave (FMCW) lidar; or a mechanical lidar with a rotating assembly), a radar sensor 96, an ultrasonic sensor, etc.;
- a location sensor 98 (e.g., based on GPS);
- a vehicle speed sensor 97;
- an inertial measurement unit (IMU) 95 including an accelerometer, gyroscope, etc.; and/or
- any other sensing device.

The vehicle 10 may be implemented in any suitable way. For example, in some embodiments, the vehicle 10, including its control system 15, may be implemented using technology as described in https://waymo.com/tech/and https://waymo.com/safetyreport/, U.S. Pat. No. 8,818,608, or U.S. Patent Application Publication 2014/0303827, all of which are incorporated by reference herein, or using any other suitable automated driving technology (e.g., one or more advanced driver-assistance systems (ADAS)).

Figure 5:
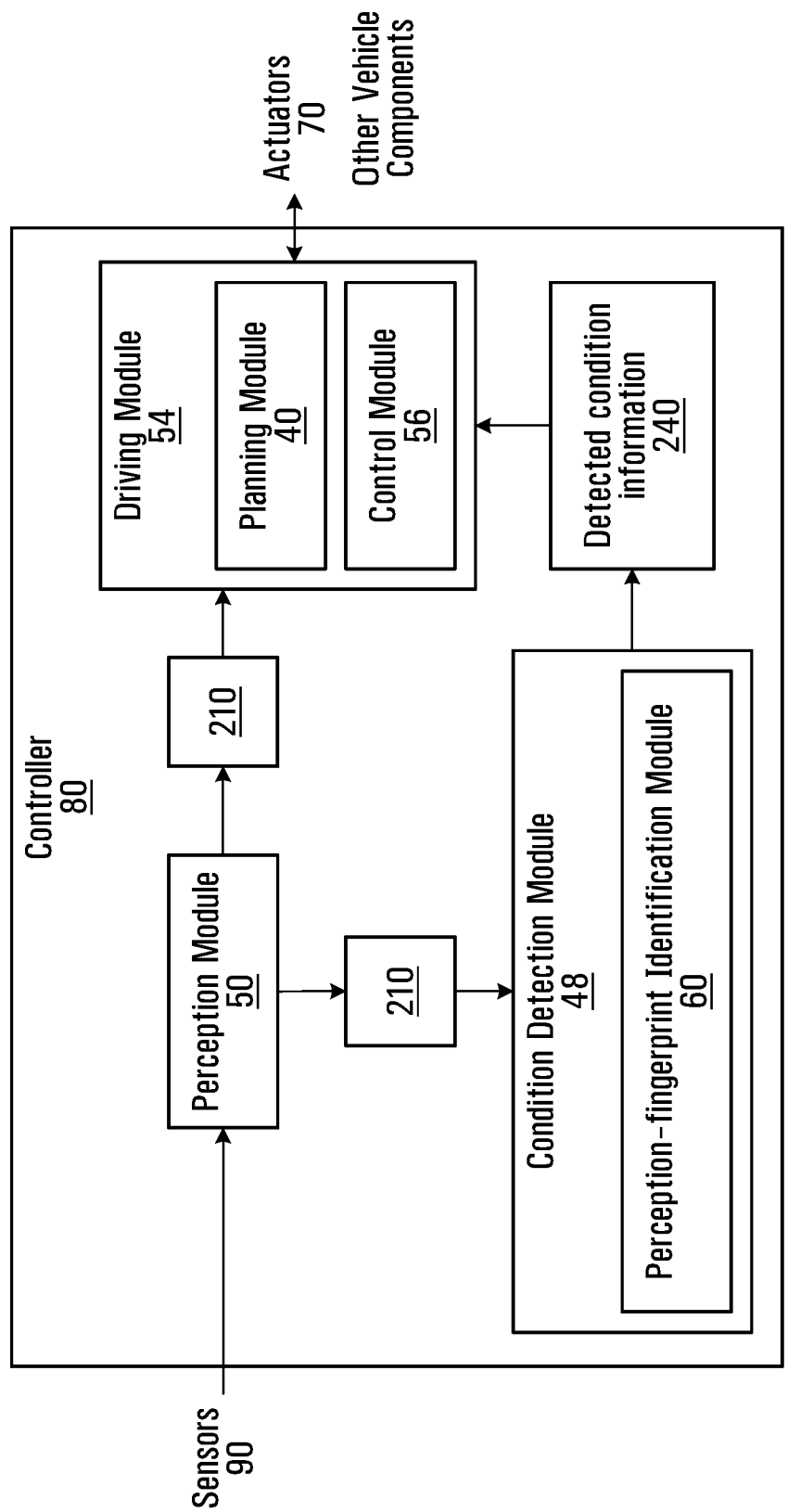
FIGS. 5 to 7 shows an embodiment of a controller of the control system of the vehicle.

With continued reference to FIG. 5, in this embodiment, the controller 80 comprises a plurality of modules to autonomously drive (e.g., accelerate, decelerate, steer, etc.) and otherwise control the vehicle 10 on the road 19 towards its destination, including a perception module 50 and a driving module 54. These modules may be implemented in any suitable way in various embodiments (e.g., such as described, for instance, in Perception, Planning, Control, and Coordination for Autonomous Vehicles by Pendleton et al., MDPI, Feb. 17, 2017, which is incorporated by reference herein, or in any known manner).

The perception module 50 is configured to provide information 210 regarding perception of the environment 11 of the vehicle 10 and the state of the vehicle 10 in real-time based on data from the sensors 90. This information 210, which will be referred to as "perception information", conveys knowledge of the environment 11 of the vehicle 10 and the vehicle's state (e.g., position, egomotion, etc.) and is used by the driving module 54 to autonomously drive the vehicle 10.

More particularly, in this embodiment, the perception module 50 is configured to generate a 3D model of the environment 11 of the vehicle 10 based on data from the sensors 90. This 3D model, which will be referred to as a "3D environmental model", comprises information providing a representation of the environment 11 of the vehicle 10, including objects 32 in that environment. The 3D environmental model may include characteristics of these objects 32, such as their class (i.e., type), their shape, their distance to the vehicle 10, their velocity, their position with relation to certain reference points, etc. The perception module 50 can detect and potentially classify various objects 32 in a scene of the environment 11 of the vehicle 10 using any suitable known techniques, such as frame-based processing, segmentation, deep-learning or other machine-learning algorithms using deep neural networks or other artificial neural networks, etc.

Figure 6:
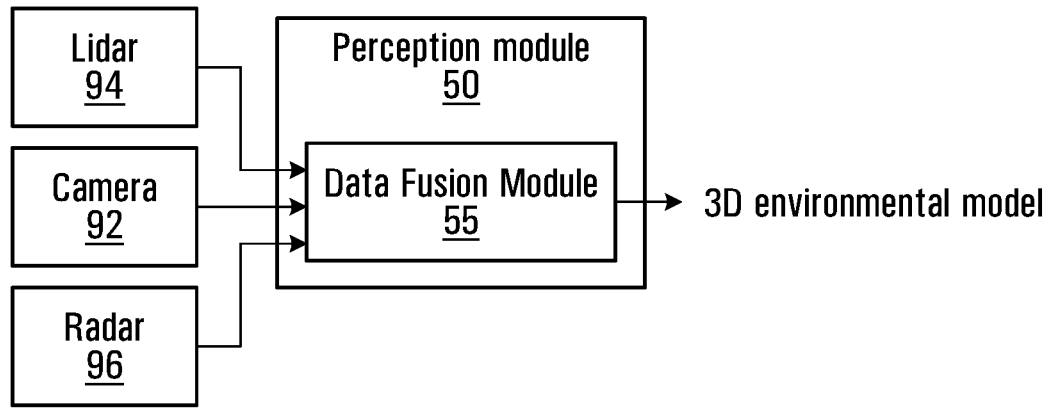

In some embodiments, as shown in FIG. 6, the perception module 50 may include a sensor data fusion module 55 configured to fuse, i.e., perform data fusion to combine, integrate, and process, data from respective ones of the sensors 90, including from the camera 92, the lidar sensor 94, and possibly others such as the radar sensor 96. Such data fusion may be implemented in any suitable way (e.g., such as described, for instance, in U.S. Patent Application Publication 2016/0291154, which is incorporated by reference herein, or in any other known manner).

The perception module 50 is also configured to generate information about the position of the vehicle 10 in its environment 11 by performing localization of the vehicle 10 to determine its position and motion, based on data from the sensors 90, such as from the location sensor 98, the vehicle speed sensor 97, and the IMU 95. This information, which will be referred to as "positional information", is indicative of the position (e.g., the location and the orientation) of the vehicle 10 and/or one or more other parameters depending on the position of the vehicle 10, such as its motion (e.g., speed, acceleration, etc.) and/or other kinematic aspects of the vehicle 10, which may be specified as its egomotion.

Thus, in this embodiment, the perception information 210 provided by the perception module 50 includes the 3D environmental model and the positional information for the vehicle 10 and may include other information derived from the sensors 90, including the data from the sensors 90 itself.

For example, in some embodiments, the perception module 50 may be implemented by a LeddarVision™ unit available from LeddarTech® (e.g., https://leddartech.com/leddarvision/) or any other commercially available technology.

The driving module 54 is configured to determine how to drive (e.g., accelerate, decelerate, and/or steer) the vehicle 10 based on the perception information 210 provided by the perception module 50, including the 3D environmental model and the positional information for the vehicle 10, and possibly other information, and to control the vehicle 10 accordingly by sending control signals to actuators 70, such as of the powertrain 14, the steering system 16, and/or other components of the vehicle 10, which control motion and/or other operational aspects of the vehicle 10.

For instance, in this embodiment, the driving module 54 may implement a planning module 40 to plan a safe path for the vehicle 10, such as by applying driving policies, respecting traffic rules, making predictions about trajectories of the vehicle 10 and other objects in its environment 11 (e.g., to avoid collisions), and/or performing other suitable operations, and a control module 56 to generate control signals sent to the actuators 70 for autonomously moving the vehicle 10 along that path.

In this embodiment, the controller 80 comprises a condition detection module 48 configured to determine whether one or more predefined conditions affecting the vehicle 10 exist based on the perception information 210 provided by the perception module 50 and, if so, generate information 240 regarding existence of the predefined condition(s) affecting the vehicle 10. This information, which will be referred to as "detected condition information", can be used by the driving module 54 to perform one or more actions concerning the vehicle 10, such as adjust autonomous driving and/or other operation of the vehicle 10, convey a message regarding the vehicle 10, and/or otherwise act to enhance performance, safety, and/or other attributes of autonomous driving of the vehicle 10. In some cases, this may provide feedback to the driving module 54 which may otherwise be unavailable and/or may allow more rapid adjustment of autonomous driving of the vehicle 10.

A given one of the predefined conditions affecting the vehicle 10 that can be detected by the condition detection module 48 and indicated by the detected condition information 240 may be environmental, i.e., external to the vehicle 10 and resulting from the environment 11 of the vehicle 10 and generally independent from objects of interest in the scene that the driving module 54 uses to determine commands that are sent to the actuators 70. Examples of objects of interest include adjacent vehicles and pedestrians, among others. For instance, in some embodiments, an environmental one of the predefined conditions affecting the vehicle 10 may relate to:

the road 19, such as a shape of the road 19 (e.g., a sinuosity or straightness of the road 19, etc.), a state of the road 19 (e.g., a slipperiness of the road 19, a roughness of the road 19, and/or other attributes of a surface of the road 19, which may relate to a wetness or dryness of the road 19, surface material of the road 19 (e.g., a paved road or non-paved road, a type of pavement such as asphalt, concrete, gravel, etc.), and/or damage (e.g., potholes, etc.) of the road 19; roadwork on the road 19; etc.), and/or any other characteristic of the road 19;

an off-road area of the environment 11 of the vehicle 10, such as one in which the vehicle 10 may have entered (e.g., deliberately or accidentally);

weather in the environment 11 of the vehicle 10, such as precipitation (e.g., rain, sleet, snow, etc.), wind (e.g., a speed or intensity of the wind, a direction of the wind, etc.), temperature, fog, and/or any other characteristic of the weather in that environment;

illumination in the environment 11 of the vehicle 10, such as a type of light (e.g., sunlight, moonlight, artificial light, outdoors, indoors such as parking or tunnel lighting, etc.), a light intensity, and/or any other characteristic of the illumination in that environment;

objects 32 in the environment 11 of the vehicle 10, such as a density of the objects 32 (e.g., a high density indicative of urban or other areas of relatively high traffic, a low density indicative of suburban, rural or other areas of relatively low traffic, etc.), distances of the objects 32 to the vehicle 10, times for the objects 32 and the vehicle 10 to reach one another (e.g., collide), and/or any other characteristic of the objects 32 in that environment; and/or any other aspect of the environment 11 of the vehicle 10.

Alternatively, the detected condition information may be indicative of conditions associated with the vehicle 10 and not directly associated with the environment 11 in which the vehicle 10 operates. Those conditions that can be detected by the condition detection module 48 and indicated by the detected condition information 240 are vehicular, i.e., intrinsic to the vehicle 10 and resulting from one or more components of the vehicle 10, such as the powertrain 14, the steering system 16, the suspension 18, the wheels 20, and/or any other component of the vehicle 10. For example, in some embodiments, a vehicular one of the predefined conditions affecting the vehicle 10 may relate to:

functionality of one or more components of the vehicle 10, such as a malfunction of a component of the vehicle 10 (e.g., excessive vibration of a component (e.g., an engine or other motor of the powertrain 14) of the vehicle 10; wear, damage, or other deterioration of a component of the vehicle 10 (e.g., a deflated or worn-out tire of a wheel 20 of the vehicle 10); a steering anomaly (e.g., excessive freedom of movement) in the steering system 16; a headlight not working properly; anomalous sound generated by the powertrain 14, the steering system 16, or the suspension 18; etc.) and/or any other dysfunction of a component of the vehicle 10;

settings of one or more components of the vehicle 10, such as power output of the powertrain 14, sensitivity (e.g., steering wheel movement) of the steering system 16, stiffness and/or damping of the suspension 18, and/or any other characteristic of settings of one or more components of the vehicle 10; and/or any other aspect of one or more components of the vehicle 10.

The detected condition information 240 generated by the condition detection module 48 and indicative of one or more predefined conditions affecting the vehicle 10 may thus be maintenance-related and indicative of malfunctions or need for maintenance or adjustment.

For instance, the perception information 210 provided by the perception module 50 may be conceptually viewed as implementing two detection streams, namely: a main or direct one which performs detection of objects of interest and the output of which is used by the driving module 54 to determine short-term actuator commands in order to provide motion control of the vehicle 10 into the 3D environmental model; and an ancillary one which looks for predefined conditions in the environment 11 that are generally independent of the objects of interest or at least independent of the characteristics of the objects of interest that determine the short-term motion control. In some embodiments, such detection streams are both carried on information conveyed at least by the lidar sensor 94 and the camera 92. In other words, information gathered by the lidar sensor 94 and by the camera 92 is used to look for both objects of interest for short-term motion control and also for the predefined conditions that influence longer-term driving policy and/or vehicle maintenance.

Thus, the perception information 210 provided by the perception module 50 can be further processed, other than for generating the control signals for motion control in the 3D environmental model, in order to detect one or more predefined conditions affecting the vehicle 10.

In this embodiment, in order to determine whether one or more predefined conditions affecting the vehicle 10 exist, the condition detection module 48 is configured to detect one or more patterns in the perception information 210 output by the perception module 50 that are indicative of existence of one or more predefined conditions. Each of these patterns, which will be referred to as a "perception fingerprint", is indicative of a predefined condition affecting the vehicle 10 such that the detected condition information 240 generated by the condition detection module 48 conveys or is otherwise based on that perception fingerprint.

In various examples, a given one of these perception fingerprints may reflect a pattern in the 3D environmental model (e.g., indicative of a predefined condition related to the road 19, weather, illumination, and/or another aspect of the environment 11 of the vehicle 10), a pattern in the positional information for (e.g., egomotion of) the vehicle 10 (e.g., indicative of a predefined condition related to malfunction of the vehicle 10, such as a worn-out or deflated tire of a wheel 20, a steering anomaly in the steering system 16, anomalous vibration of a motor of the powertrain 14, and/or another aspect of one or more components of the vehicle 10), a pattern in both the 3D environmental model and the positional information for the vehicle 10, or a pattern in neither of the 3D environmental model and the positional information for the vehicle 10 (e.g., in the data from the sensors 90). Also, a given one of these perception fingerprints may be a pattern of data from a combination of different ones of the sensors 90 that would be undetectable by considering any of these different ones of the sensors 90 individually.

More particularly, in this embodiment, the condition detection module 48 comprises a perception-fingerprint identification module 60 configured to detect one or more perception fingerprints from the perception information 210 provided by the perception module 50 and cause the detected condition information 240 generated by the condition detection module 48 to convey or otherwise be based on these one or more perception fingerprints.

The perception-fingerprint identification module 60 may implement any suitable algorithm for pattern recognition to detect one or more perception fingerprints from the perception information 210 provided by the perception module 50. For example, in this embodiment, the perception-fingerprint identification module 60 implements artificial intelligence (AI—sometimes also referred to as machine intelligence or machine learning), such as an artificial neural network, a support vector machine, or any other AI unit, in software, hardware and/or a combination thereof configured to recognize perception fingerprints from the perception information 210 provided by the perception module 50.

Figure 7:
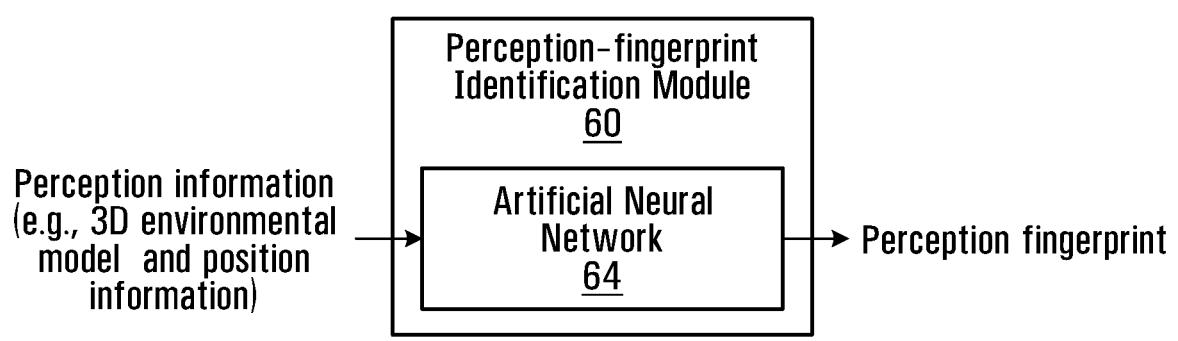

More specifically, in this embodiment, shown in FIG. 7, the perception-fingerprint identification module 60 comprises an artificial neural network 64 configured to detect one or more perception fingerprints from the perception information 210 provided by the perception module 50. The artificial neural network 64 may be a deep neural network (e.g., convolutional, recurrent, etc.) and/or implemented using any known kind of neural network technology.

The artificial neural network 64 is configured to learn how to detect one or more perception fingerprints from the perception information 210 provided by the perception module 50. Learning by the artificial neural network 64 may be achieved using any known supervised, semi-supervised, or unsupervised technique.

In some embodiments, the artificial neural network 64 may learn during a learning mode by processing "training" data conveying information (e.g., similar to what would be part of the perception information 210) that one is looking for in the 3D environmental model and/or the positional information for the vehicle 10, in particular data including one or more perception fingerprints that are to be detected and thus indicative of one or more predefined conditions affecting the vehicle 10. For instance, a training vehicle with sensors, a perception module, and an artificial neural network similar to the sensors 90, the perception module 50, and the artificial neural network 64 of the vehicle 10 may be driven in situations characterized by predefined conditions of interest such that the perception module of the training vehicle generates training data that contains perception fingerprints (i.e., patterns) indicative of these predefined conditions and the artificial neural network of the training vehicle learns to identify these perception fingerprints by processing this training data.

For example, in some embodiments, if predefined conditions to be detected include a rough road, a paved road, a slippery road, a sinuous road, strong winds, heavy snow, sleet, artificial light, a worn-out tire, a deflated tire, a motor (e.g., engine) vibrating abnormally, a headlight not working properly, a steering anomaly, anomalous sound, or a combination thereof (e.g., a rough road with strong winds, a slippery road with strong winds, a slippery sinuous road, a slippery sinuous road with strong winds, a slippery road in artificial light, a slippery road with worn-out tires, a rough road with deflated tires, artificial light with a headlight not working, etc.), or any other predefined condition to be detected, the learning mode may involve, for each given one of these predefined conditions, driving the training vehicle in one or more situations characterized by that given predefined condition (e.g., on one or more rough roads, on one or more paved roads, on one or more slippery roads, on one or more sinuous roads, in one or more weather events with strong winds, in one or more weather events with heavy snow, in one or more weather events with sleet, in one or more areas with artificial light, with one or more worn-out tires, with one or more deflated tires, with one or more steering anomalies, with one or more anomalous motor vibrations, with one or more anomalous sounds, etc.) such that the perception module of the training vehicle generates training perception information that contains a perception fingerprint indicative of that given predefined condition and the artificial neural network of the training vehicle learns to identify that perception fingerprint.

In some embodiments, perception fingerprints detectable by the perception-fingerprint identification module 60 and predefined conditions affecting the vehicle 10 that they are indicative of may thus be maintained in a library or other database. In some cases, the perception-fingerprint identification module 60 may attempt to identify a perception fingerprint that has not previously been seen, in which cases, the perception-fingerprint identification module 60 may determine if that perception fingerprint is different or anomalous with respect to previously-encountered perception fingerprints. For instance, in a neural network implementation, a perception fingerprint may be a class of information the neural network is trained to detect by looking at the sensor data. With the embodiments in FIGS. 6 and 7, the perception-fingerprint identification module 60 may continuously output a perception fingerprint that distinguishes the immediate environment 11 in which the vehicle 10 operates among other environments the module 60 is capable to identify in the perception information 210.

That perception fingerprint can be used as a further input to the driving module 54 to condition the signals sent to the actuators 70 of the vehicle 10. Accordingly, the driving module 54 uses two inputs that both originate from the same perception information 210, in particular object-of-interest information determining short-term motion control and environmental input which conditions the actual rules that determine the short-term motion control. For example, if the environment input indicates that the information produced by the sensors is classified in a fingerprint associated with a slippery road, that input would affect the short-term motion control determined by the driving module 54, for instance steering input, throttle input and brake input would be modulated differently to account for the expected slippery surface of the road.

The artificial neural network 64 of the condition detection module 48 may be trained to identify a perception fingerprint indicative of a predefined condition affecting the vehicle 10 from the perception information 210 provided by the perception module 50, even if the sensors 90 are not designed to directly measure the predefined condition. For example, in some embodiments, vibration of a motor (e.g., an engine) of the powertrain 14 can be identified as an anomalous pattern in the positional information for (e.g., egomotion of) the vehicle 10 or a signal from the IMU 95 in the perception information 210, as classification of the pattern by the artificial neural network 64 indicates the source of the vibration, since the classification will be able to separate or distinguish the vibration with its fingerprint, and natural frequency, from rough road surfaces and other phenomena external to the vehicle 10 that may be at play.

Figure 8:
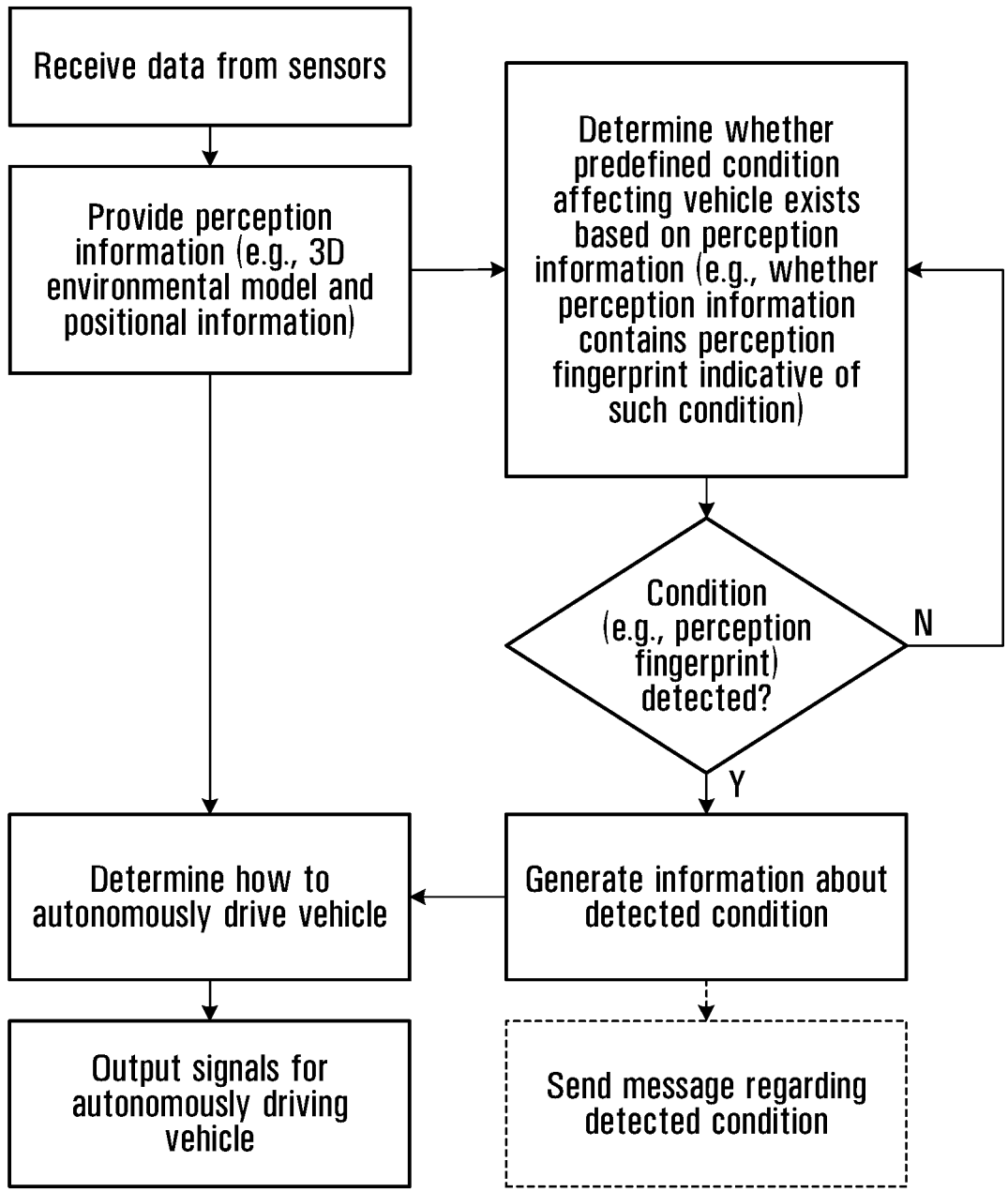
FIG. 8 shows an example of a process implemented by the controller.

With additional reference to FIG. 8, in this embodiment, the controller 80 may therefore implement a process as follows.

The perception module 50 generates the perception information 210, including the 3D environmental model and the positional information for the vehicle 10, based on the data from the sensors 90, and the driving module 54 uses the perception information 210 to determine how to drive (e.g., accelerate, decelerate, and steer) the vehicle 10 and issue signals to the actuators 70 (e.g., of the powertrain 14, the steering system 16, etc.) such that the vehicle 10 is autonomously driven accordingly.

Meanwhile, the condition detection module 48 processes the perception information 210 provided by the perception module 50 to determine whether it contains one or more perception fingerprints indicative of one or more predefined conditions affecting the vehicle 10. If the condition detection module 48 detects one or more perception fingerprints indicative of one or more predefined conditions affecting the vehicle 10, the detected condition information 240 generated by the condition detection module 48 conveys or is otherwise based on these one or more perception fingerprints.

The driving module 54 uses the detected condition information 240, which conveys or is otherwise based on the perception fingerprint(s) indicative of the predefined condition(s) affecting the vehicle 10, to perform one or more actions concerning the vehicle 10.

For example, in some embodiments, the driving module 54 may adjust autonomous driving and/or other operation of the vehicle 10 based on the perception fingerprint(s) detected by the condition detection module 48. For instance, in some cases, if the detected perception fingerprint(s) indicate(s) that the road 19 is rough, slippery, and/or sinuous, there are strong winds, one or more tires of the wheels 20 are worn-out or deflated, a motor (e.g., engine) of the powertrain 14 vibrates abnormally, there is a steering anomaly in the steering system 16, etc., the driving module 54 may adjust the logic to determine the short-term actuator commands and autonomously drive the vehicle 10 slower (e.g., reduce the speed of the vehicle 10 when going straight and/or turning), reduce the stiffness or increase the damping of the suspension 18, etc. Conversely, if the detected perception fingerprint(s) indicate(s) that the road 19 is smooth, dry, and/or straight, there is no strong wind, etc., the driving module 54 may adjust the short-term control logic to autonomously drive the vehicle 10 faster (e.g., increase the speed of the vehicle 10 when going straight and/or turning), increase the stiffness or decrease the damping of the suspension, etc. The driving module 54 can issue signals to the actuators 70, such as of the powertrain 14, the steering system 16, and/or the suspension 18, to adjust autonomous driving of the vehicle 10 in this way.

As another example, in some embodiments, the driving module 54 may convey a message regarding the vehicle 10, such as to an individual (e.g., a user of the vehicle 10) or a computing device, based on the perception fingerprint(s) detected by the condition detection module 48. The message may be indicative of malfunction or another problem with one or more components of the vehicle 10. For instance, in some cases, the driving module 54 may convey a notification of maintenance, repair, or other servicing to be performed on the vehicle 10 if the detected perception fingerprint(s) indicate(s) that one or more tires of the wheels 20 are worn-out or deflated, one or more headlights are not working, a motor (e.g., engine) of the powertrain 14 vibrates abnormally, there is a steering anomaly in the steering system 16, etc. In some embodiments, the message regarding the vehicle 10 may be conveyed to the user interface 70 of the vehicle 10. In other embodiments, the message regarding the vehicle 10 may be conveyed to a communication device (e.g., a smartphone or computer) that is distinct (i.e., not part of the vehicle 10, and possibly external to the vehicle 10) via the communication interface 68 of the vehicle 10.

The condition detection module 48 may be configured to determine whether one or more predefined conditions affecting the vehicle 10 exist in various other ways in other embodiments.

Figure 9:
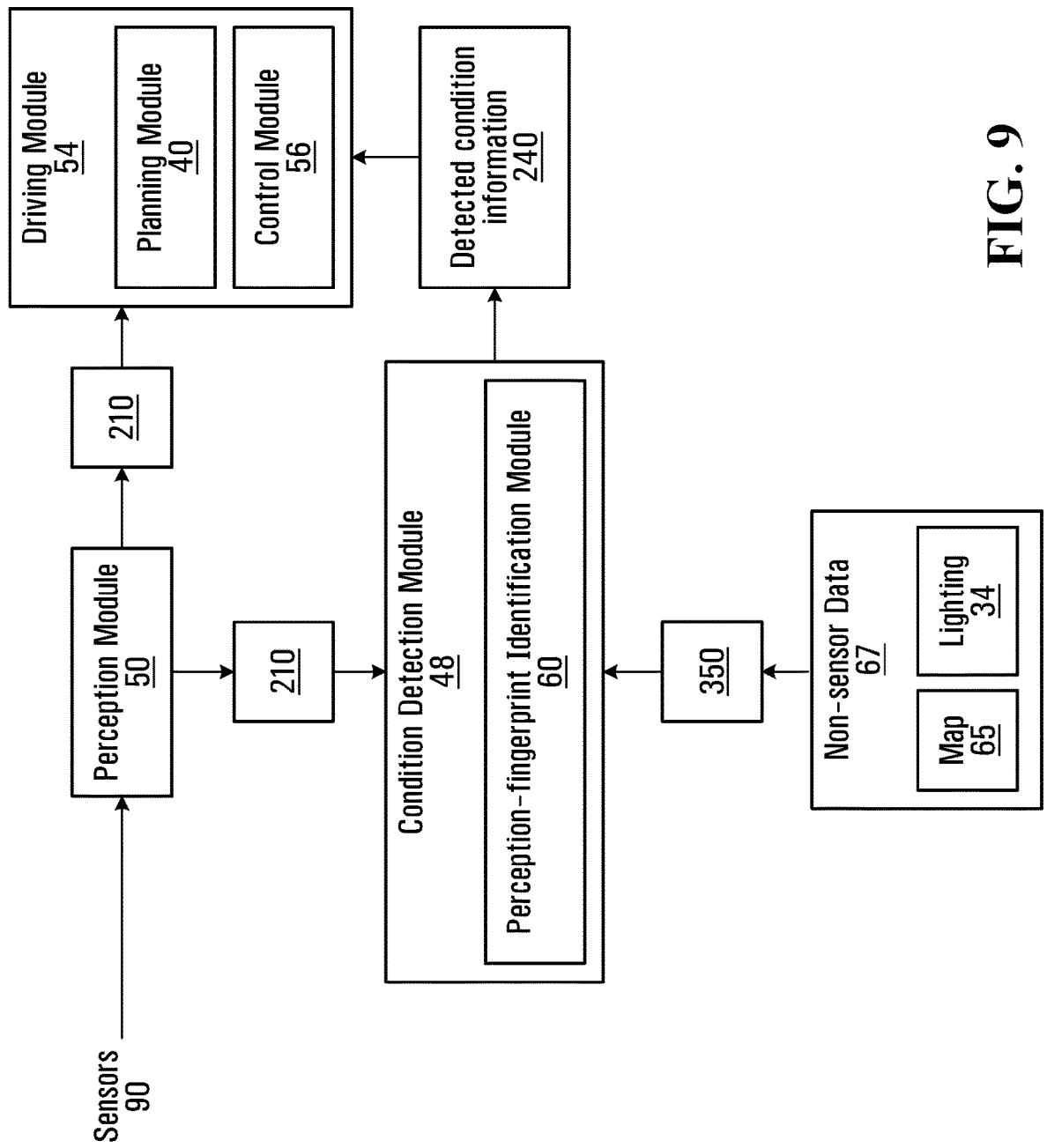
FIGS. 9 and 10 show variants for the controller in other embodiments.

For example, in some embodiments, as shown in FIG. 9, in order to determine whether one or more predefined conditions affecting the vehicle 10 exist, the condition detection module 48 may be configured to compare the perception information 210 provided by the perception module 50 to other information 350 available to the controller 80 and distinct from the 3D environmental model and the positional information for (e.g., egomotion of) the vehicle 10. This information 350, which will be referred to as "perception-independent reference information", can be obtained from one or more sources independent from the sensors 90 used to generate the 3D environmental model and the positional information for the vehicle 10. When determining that the perception information 210 does not match the perception-independent reference information 350, the condition detection module 48 determines that a predefined condition affecting the vehicle 10 exists and generates the detected condition information 240 so that it is indicative of that predefined condition, is valid and can be used by the driving module 54 to perform one or more actions concerning the vehicle 10, such as adjusting autonomous driving and/or other operation of the vehicle 10 or conveying a message regarding the vehicle 10, as discussed previously.

In some embodiments, the perception-independent reference information 350 may be derived from data 67 representative of expectations related to the vehicle 10 (e.g., related to the environment 11 of the vehicle and/or one or more operational aspects of the vehicle 10), which may be stored in the memory 70 of the controller 80, received via the communication interface 68, or otherwise available to the controller 80.

As an example, in some embodiments, the perception-independent reference information 350 may be derived from a map 65 (e.g., a high-definition map) representative of a locality of the vehicle 10, and which may be stored in the memory 70 of the controller 80, received via the communication interface 68, or otherwise available to the controller 80. The map 65 may provide the perception-independent reference information 350, such as a kind of road surface of the road 19 that the vehicle 10 should expect to encounter at a particular location (e.g., paved road, unpaved road, open country, sandy beach, etc.). The driving module 54 may control the vehicle 10 based on this information provided by the map 65.

By comparing the perception information 210 provided by the perception module 50 and the perception-independent reference information 350 provided by the map 65, the condition detection module 48 can determine whether the surface of the road 19 as perceived by the perception module 50 (e.g., based on the 3D environmental model and/or the egomotion of the vehicle 10) is indeed as predicted by the map 65 and, if not, generate the detected condition information 240 so that it is indicative of how the surface of the road 19 actually is. The driving module 54 may then determine whether and how to adjust autonomous driving of the vehicle 10 based on the detected condition information 240. For instance, if the driving module 54 determines based on the detected condition information 240 that estimated actuator settings of the actuators 70 are improper (e.g., suboptimal or insufficient) for smoothness of drive and safety, the driving module 54 may send signals to the actuators 70 to adjust this accordingly.

As another example, in some embodiments, the perception-independent reference information 350 may be derived from a lighting model 34 representative of expected lighting (e.g., light and shadow) around the vehicle 10, which may be stored in the memory 70 of the controller 80, received via the communication interface 68, or otherwise available to the controller 80.

By comparing actual lighting conveyed by the perception information 210 provided by the perception module 50 (e.g., based on images from the camera 92) and the expected lighting specified by the lighting model 34 of the perception-independent reference information 350, the condition detection module 48 can determine whether the actual lighting as perceived by the perception module 50 is indeed as predicted by the lighting model 34 and, if not, generate the detected condition information 240 so that it is indicative of the actual lighting. The driving module 54 may then determine whether and how to adjust autonomous driving of the vehicle 10 based on the detected condition information 240. For instance, if the driving module 54 determines based on the detected condition information 240 that settings of the actuators 70 are improper (e.g., suboptimal or insufficient) for smoothness of drive and safety, the driving module 54 may send signals to the actuators 70 to adjust this accordingly. Alternatively or additionally, the driving module 54 may send a message indicating that maintenance or other servicing is to be performed on the vehicle 10.

Figure 10:
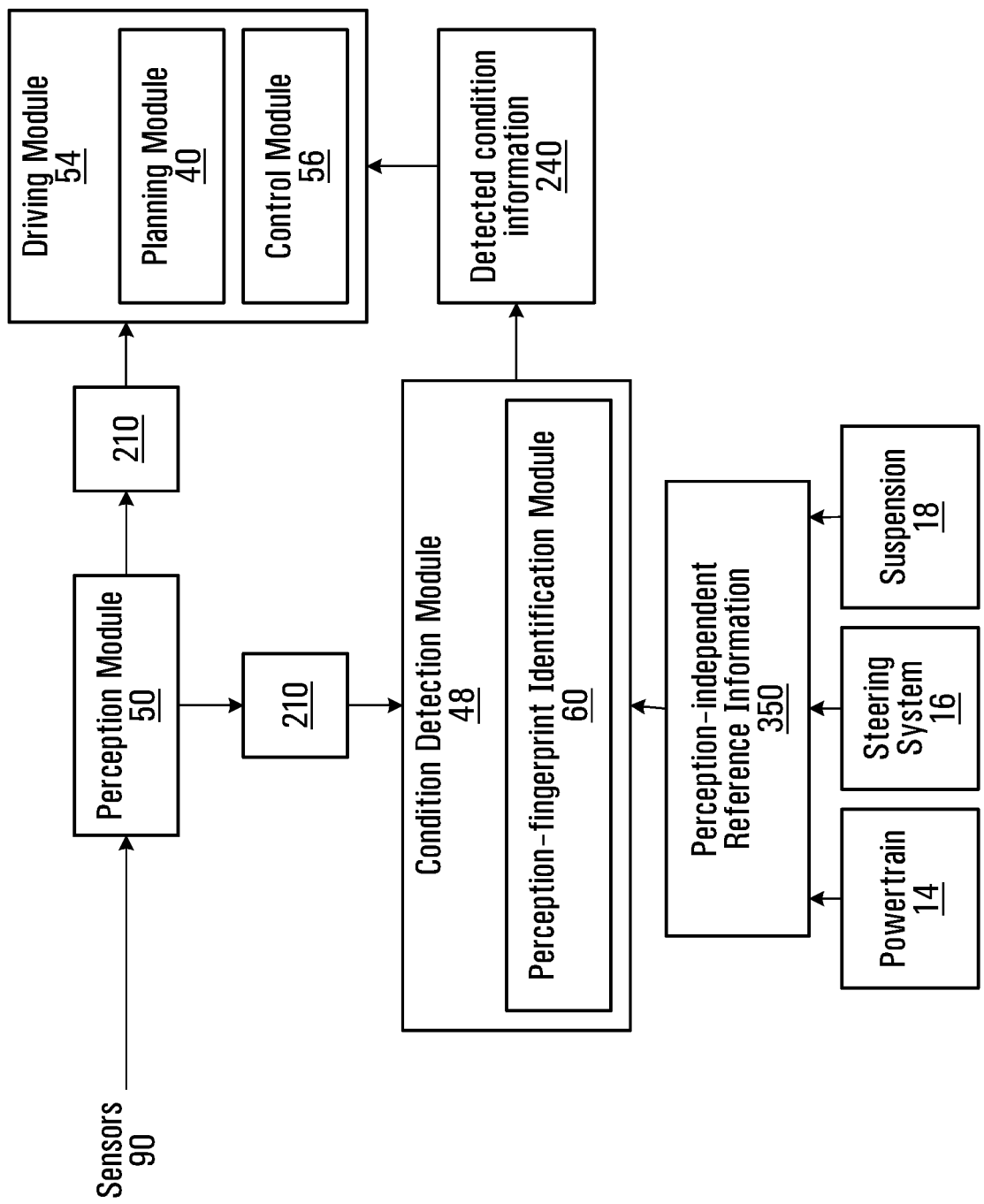

In some embodiments, as shown in FIG. 10, the perception-independent reference information 350 may be derived from the powertrain 14, the steering system 16, the suspension 18, and/or any other component controlling motion of the vehicle 10. For example, in some embodiments, the perception-independent reference information 350 may be indicative of steering movement of steered ones of the wheels 20 effected by the steering system 16 as reported on the vehicle bus 58 (e.g., CAN bus), while the egomotion of the vehicle 10 included in the perception information 210 provided by the perception module 50 can be used to estimate perceived (e.g., past) steering movement of the steered ones of the wheels 20.

By comparing the perceived steering wheel movement with the reported steering wheel movement, the condition detection module 48 can determine whether the steering wheel movement as perceived by the perception module 50 indeed corresponds to the steering wheel movement as reported on the vehicle bus 58 and, if not, generate the detected condition information 240 so that it is indicative of what the steering wheel movement actually is. The driving module 54 may then determine whether and how to adjust autonomous driving of the vehicle 10 based on the detected condition information 240. For instance, if the driving module 54 determines based on the detected condition information 240 that estimated actuator settings of respective ones of the actuators 70 in the steering system 16 are improper (e.g., suboptimal or insufficient) for steerability, the driving module 54 may send signals to these actuators 70 to adjust this accordingly. Alternatively, or additionally, the driving module 54 may send a message indicating that maintenance or other servicing is to be performed on the vehicle 10.

As another example, in some embodiments, in order to determine whether one or more predefined conditions affecting the vehicle 10 exist, the condition detection module 48 may be configured to monitor temporal variation (i.e., variation in time) of the perception information 210 provided by the perception module 50. For instance, the condition detection module 48 may monitor temporal variation of parameters that depend on the 3D environmental model and, when observing that one or more of these parameters of the 3D environmental model vary in time in a prescribed way deemed to be indicative of a predefined condition affecting the vehicle 10, the condition detection module 48 generates the detected condition information 240 so that it is indicative of that predefined condition and can be used by the driving module 54 to perform one or more actions concerning the vehicle 10, such as adjusting autonomous driving and/or other operation of the vehicle 10 or conveying a message regarding the vehicle 10, as discussed previously.

For instance, in some embodiments, the condition detection module 48 may monitor a time-dependent statistical behavior of the 3D environmental model. For example, a distribution of "distance to obstacle" or "time to collision" for objects 32 in the environment 11 of the vehicle 10 may be monitored. Desirable behavior within a given driving scenario might be that changes to that distribution are slow and smooth (e.g., below a threshold rate). Control of the vehicle 10 by the driving module 54 is determined by driving policy, and tracking statistics of the environmental model distribution may help to evaluate different policies and adjust between them.

In another variant, a perception fingerprint may be used solely for vehicle maintenance purposes, without impact on motion control. In such instance, the perception-fingerprint identification module 60 may, in addition to camera and lidar data, receive an input from drivetrain sensors configured to detect specific malfunctions or drivetrain conditions. In this instance, the condition detection module 48 would provide a higher level of intelligence in fault detection and trigger a maintenance message when the actual impact of a fault condition, reported by a drivetrain sensor, is observed in the 3D environmental model.

While in embodiments considered above the vehicle 10 travels on land, the vehicle 10 may travel other than on land in other embodiments. For example, in other embodiments, the vehicle 10 may fly (e.g., a delivery drone or other unmanned aerial vehicle, a flying car or other personal air vehicle, etc.) or travel on water (e.g., a water taxi or other boat), such that "driving" generally means operating, controlling, and directing a course of the vehicle 10.

Certain additional elements that may be needed for operation of some embodiments have not been described or illustrated as they are assumed to be within a purview of those of ordinary skill. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but is not limiting. Various modifications and enhancements will become apparent to those of ordinary skill.

The invention claimed is:

1. A system for autonomous driving of a vehicle, the system comprising:
    an interface configured to receive data from sensors of the vehicle that include a camera and a lidar sensor; and
    a processing entity comprising at least one processor and configured to:
        provide perception information regarding perception of an environment of the vehicle and a state of the vehicle based on the data from the sensors, the perception information comprising a 3D model of the environment of the vehicle and information about a position of the vehicle;
        generate control signals for autonomously driving the vehicle based on the 3D model of the environment of the vehicle and the information about the position of the vehicle; and
        process the perception information, other than for generating the control signals for autonomously driving the vehicle based on the 3D model of the environment of the vehicle and the information about the position of the vehicle, to determine whether a predefined condition affecting the vehicle and independent of any other vehicles, pedestrians and other objects of interest detected in the environment of the vehicle exists and, if so, perform an action concerning the vehicle based on the predefined condition, wherein, to determine that the predefined condition affecting the vehicle and independent of any other vehicles, pedestrians and other objects of interest detected in the environment of the vehicle exists, the processing entity is configured to detect a pattern in the perception information indicative of the predefined condition.

2. The system of claim 1, wherein the processing entity comprises an artificial neural network trained to detect the pattern in the perception information indicative of the predefined condition.

3. The system of claim 1, wherein the pattern in the perception information indicative of the predefined condition is in the 3D model of the environment of the vehicle.

4. The system of claim 1, wherein the pattern in the perception information indicative of the predefined condition is in the information about the position of the vehicle.

5. The system of claim 1, wherein the pattern in the perception information indicative of the predefined condition is in both the 3D model of the environment of the vehicle and the information about the position of the vehicle.

6. The system of claim 1, wherein the pattern in the perception information indicative of the predefined condition is in neither of the 3D model of the environment of the vehicle nor the information about the position of the vehicle.

7. The system of claim 1, wherein the pattern in the perception information indicative of the predefined condition arises from a combination of different ones of the sensors and is undetectable from any of the different ones of the sensors individually.

8. The system of claim 1, wherein, to determine that the predefined condition affecting the vehicle and independent of any other vehicles, pedestrians and other objects of interest detected in the environment of the vehicle exists, the processing entity is configured to monitor temporal variation of the perception information.

9. The system of claim 1, wherein the predefined condition affecting the vehicle and independent of any other vehicles, pedestrians and other objects of interest detected in the environment of the vehicle is external to the vehicle and results from the environment of the vehicle.

10. The system of claim 9, wherein the predefined condition affecting the vehicle and independent of any other vehicles, pedestrians and other objects of interest detected in the environment of the vehicle relates to a road on which the vehicle travels.

11. The system of claim 10, wherein the predefined condition affecting the vehicle and independent of any other vehicles, pedestrians and other objects of interest detected in the environment of the vehicle relates to a slipperiness of the road.

12. The system of claim 10, wherein the predefined condition affecting the vehicle and independent of any other vehicles, pedestrians and other objects of interest detected in the environment of the vehicle relates to a roughness of the road.

13. The system of claim 10, wherein the predefined condition affecting the vehicle and independent of any other vehicles, pedestrians and other objects of interest detected in the environment of the vehicle relates to a shape of the road.

14. The system of claim 10, wherein the predefined condition affecting the vehicle and independent of any other vehicles, pedestrians and other objects of interest detected in the environment of the vehicle relates to a sinuosity of the road.

15. The system of claim 9, wherein the predefined condition affecting the vehicle and independent of any other vehicles, pedestrians and other objects of interest detected in the environment of the vehicle relates to weather in the environment of the vehicle.

16. The system of claim 15, wherein the predefined condition affecting the vehicle and independent of any other vehicles, pedestrians and other objects of interest detected in the environment of the vehicle relates to precipitation in the environment of the vehicle.

17. The system of claim 15, wherein the predefined condition affecting the vehicle and independent of any other vehicles, pedestrians and other objects of interest detected in the environment of the vehicle relates to wind in the environment of the vehicle.

18. The system of claim 9, wherein the predefined condition affecting the vehicle and independent of any other vehicles, pedestrians and other objects of interest detected in the environment of the vehicle relates to illumination in the environment of the vehicle.

19. The system of claim 1, wherein the predefined condition affecting the vehicle and independent of any other vehicles, pedestrians and other objects of interest detected in the environment of the vehicle is intrinsic to the vehicle and results from a component of the vehicle.

20. The system of claim 19, wherein the predefined condition affecting the vehicle and independent of any other vehicles, pedestrians and other objects of interest detected in the environment of the vehicle relates to malfunction of the component of the vehicle.

21. The system of claim 19, wherein the predefined condition affecting the vehicle and independent of any other vehicles, pedestrians and other objects of interest detected in the environment of the vehicle relates to deterioration of the component of the vehicle.

22. The system of claim 21, wherein: the component of the vehicle is a tire of a wheel of the vehicle; and the predefined condition affecting the vehicle and independent of any other vehicles, pedestrians and other objects of interest detected in the environment of the vehicle relates to wear of the tire.

23. The system of claim 21, wherein: the component of the vehicle is a tire of a wheel of the vehicle; and the predefined condition affecting the vehicle and independent of any other vehicles, pedestrians and other objects of interest detected in the environment of the vehicle relates to deflation of the tire.

24. The system of claim 19, wherein the predefined condition affecting the vehicle and independent of any other vehicles, pedestrians and other objects of interest detected in the environment of the vehicle relates to vibration of the component of the vehicle.

25. The system of claim 19, wherein: the component of the vehicle is a steering system of the vehicle; and the predefined condition affecting the vehicle and independent of any other vehicles, pedestrians and other objects of interest detected in the environment of the vehicle relates to a steering anomaly of the steering system.

26. The system of claim 19, wherein: the component of the vehicle is a headlight of the vehicle; and the predefined condition affecting the vehicle and independent of any other vehicles, pedestrians and other objects of interest detected in the environment of the vehicle relates to the headlight of the vehicle not working properly.

27. The system of claim 1, wherein the action concerning the vehicle comprises an adjustment of autonomous driving of the vehicle based on the predefined condition.

28. The system of claim 1, wherein the action concerning the vehicle comprises generation of a signal directed to a component of the vehicle based on the predefined condition.

29. The system of claim 28, wherein the component of the vehicle is a powertrain of the vehicle.

30. The system of claim 28, wherein the component of the vehicle is a steering system of the vehicle.

31. The system of claim 1, wherein the action concerning the vehicle comprises conveyance of a message regarding the vehicle.

32. The system of claim 31, wherein the message regarding the vehicle is indicative of malfunction of a component of the vehicle.

33. A system for autonomous driving of a vehicle, the system comprising:
- an interface configured to receive data from sensors of the vehicle that include a camera and a lidar sensor; and
- a processing entity comprising at least one processor and configured to:
  - provide perception information regarding perception of an environment of the vehicle and a state of the vehicle based on the data from the sensors, the perception information comprising a 3D model of the environment of the vehicle and information about a position of the vehicle;
  - generate control signals for autonomously driving the vehicle based on the 3D model of the environment of the vehicle and the information about the position of the vehicle;
  - process the perception information to detect a pattern in the perception information indicative of a predefined condition affecting the vehicle and independent of any other vehicles, pedestrians and other objects of interest detected in the environment of the vehicle; and
  - perform an action concerning the vehicle based on the predefined condition.

34. Non-transitory computer-readable media comprising instructions executable by a processing apparatus for autonomous driving of a vehicle, wherein the instructions, when executed by the processing apparatus, cause the processing apparatus to:
- receive data from sensors of the vehicle that include a camera and a lidar sensor;
- provide perception information regarding perception of an environment of the vehicle and a state of the vehicle based on the data from the sensors, the perception information comprising a 3D model of the environment of the vehicle and information about a position of the vehicle;
- generate control signals for autonomously driving the vehicle based on the 3D model of the environment of the vehicle and the information about the position of the vehicle; and
- process the perception information, other than for generating the control signals for autonomously driving the vehicle based on the 3D model of the environment of the vehicle and the information about the position of the vehicle, to determine whether a predefined condition affecting the vehicle and independent of any other vehicles, pedestrians and other objects of interest detected in the environment of the vehicle exists and, if so, perform an action concerning the vehicle based on the predefined condition, wherein, to determine that the predefined condition affecting the vehicle and independent of any other vehicles, pedestrians and other objects of interest detected in the environment of the vehicle exists, the processing apparatus is caused to detect a pattern in the perception information indicative of the predefined condition.

* * * * *